United States Patent [19]

Debnam, Jr. et al.

[11] Patent Number: 4,491,427
[45] Date of Patent: Jan. 1, 1985

[54] REUSABLE THERMAL CYCLING CLAMP

[75] Inventors: William J. Debnam, Jr., Hampton; Archibald L. Fripp, Williamsburg; Roger K. Crouch, Newport News, all of Va.

[73] Assignee: The United States of America as represented by the Administrator of the National Aeronautics and Space Administration, Washington, D.C.

[21] Appl. No.: 322,321

[22] Filed: Nov. 17, 1981

[51] Int. Cl.³ .............................................. G01K 1/00
[52] U.S. Cl. .................................... 374/208; 374/210
[58] Field of Search ............... 374/208, 210; 285/322, 285/DIG. 12, 45, 47, 53, 55, 238, DIG. 6, 34, 35; 403/29, 30, 28, 342, 290

[56] References Cited

U.S. PATENT DOCUMENTS

| 633,499 | 9/1899 | Bray | 285/322 |
|---|---|---|---|
| 1,086,641 | 2/1914 | Blume | 285/322 |
| 1,324,046 | 12/1919 | Hatfield | 285/DIG. 12 |
| 1,554,703 | 9/1925 | Berry | 403/29 |
| 2,461,414 | 2/1949 | Donner | 285/238 |
| 2,583,388 | 1/1952 | Nelson et al. | 403/29 |
| 3,232,648 | 2/1966 | Franck | 285/322 |
| 3,858,914 | 1/1975 | Karie et al. | 285/238 |
| 4,190,257 | 2/1980 | Schnitzler | 277/DIG. 6 |

FOREIGN PATENT DOCUMENTS

| 926435 | 5/1973 | Canada | 277/DIG. 6 |
|---|---|---|---|
| 1576375 | 8/1969 | France | 285/322 |
| 7833293 | 7/1980 | France | 285/322 |

*Primary Examiner*—Charles Frankfort
*Assistant Examiner*—David R. Schuster
*Attorney, Agent, or Firm*—Howard J. Osborn; John R. Manning

[57] ABSTRACT

A reusable metal clamp 10 for retaining a fused quartz ampoule 25 during temperature cycling in the range of 20° C. to 1000° C. A compressible graphite foil 27 having a high radial coefficient of thermal expansion is interposed between the fused quartz ampoule 25 and metal clamp 10 to maintain a snug fit between these components at all temperature levels in the cycle.

8 Claims, 4 Drawing Figures

REUSABLE THERMAL CYCLING CLAMP

ORIGIN OF THE INVENTION

The invention described herein was made by employees of the U.S. Government and may be manufactured and used by or for the Government for governmental purposes without the payment of any royalties thereon or therefor.

BACKGROUND OF THE INVENTION

In research and development of structural materials and, in particular, the National Aeronautics and Space Administration, directional solidification experiments that are part of the planned materials processing in space (MPS) program for the manned Space Shuttle during the next few years, are the process steps involving insertion into and retrieval from a high temmperature furnace of a fused quartz ampoule. These fused quartz ampoules are used to house material samples subject to thermal cycling from 20° C. to temperatures exceeding +1000° C. Presently, high temperature resistant adhesive cements are utilized to attach the fused quartz ampoules to the metal insertion-retrieval mechanism. Adhesives that can withstand the extreme temperatures contemplated for use with the present technique would likely be of a ceramic origin and brittle. Thus, failure of the adhesive connection may occur due to the different coefficients of thermal expansion between the fused quartz and the metal insertion-retrieval rod. Also, cemented objects may not be reusable, leading to higher costs and creating additional problems after each thermal cycling test.

Also, fused quartz to metal seals have been employed by fusing various transition materials such as Kovar and Pyrex between the metal holder and the fused quartz and molybdenum to quartz seals can be made without the use of a transition layer. Holders made with a transition material, as well as clamps employing O-ring type connections have a limited temperature capability and are thus not suitable in the temperature cycling tests contemplated by the present invention. The molybdenum to fused quartz seals are not temperature limited, but their formation involves a highly specialized process and is of limited availability. Each of these prior art systems require construction of a new holding mechanism for each test operation.

It is therefore an object of the present invention to provide a reusable novel connection or clamp mechanism between objects adapted to be subjected to thermal cycling.

Another object of the present invention is a novel reusable clamp for connecting two objects.

A further object of the present invention is to provide a clamp connection for two objects that will maintain a snug connection therebetween throughout the temperature cycle of 20° C. to 1000° C. and without danger of rupturing fragile test objects.

An additional object of the present invention is a method for releasably connecting a fused quartz object to a thermal cycling resistance insertion tool.

A further object of the present invention is a clamp mechanism for a thermal cycling test object that will maintain constant pressure on the test object during a temperature cycle.

Another object of the present invention is to provide a reusable retention mechanism for insertion and withdrawal of a fused quartz object relative to a high temperature environment.

According to the present invention the foregoing and additional objects are attained by providing a reusable clamp device integrally attached to or formed with a temperature resistant metal insertion/retrieval rod or sting device and adapted to releasably retain a test fused quartz ampoule. The reusable clamp device is in the form of a sleeve having a first end portion integral with the metal rod and a second end portion being a plurality of circumferentially disposed spaced fingers extending from and along the longitudinal axis of the first end portion. At least a portion of the spaced fingers are provided with circumferentional exterior threads to receive a threaded lock nut or collar thereon. As the lock nut is tightened, a squeezing or inwardly biasing force is exerted on the fingers to cause a clamping force to be exerted on the portion of the fused quartz ampoule positioned within the fingers. A compressible seal or packing is provided between the quartz ampoule and the fingers. This compressible seal is selected from a material which has an anisotropic thermal expansion coefficient with negligible expansion in the plane of the quartz rod walls but a relatively large coefficient of expansion in the radial direction to thereby maintain a snug fit between the fused quartz material and the clamp when temperature cycled between 20° C. and 1000° C.

BRIEF DESCRIPTION OF THE DRAWINGS

A more complete appreciation of the invention and many of the attendant advantages thereof will be better understood as the same becomes more readily apparent by reference to the following detailed description when considered in connection with the accompanying drawings, wherein.

DETAILED DESCRIPTION OF THE INVENTION

Figure 1:
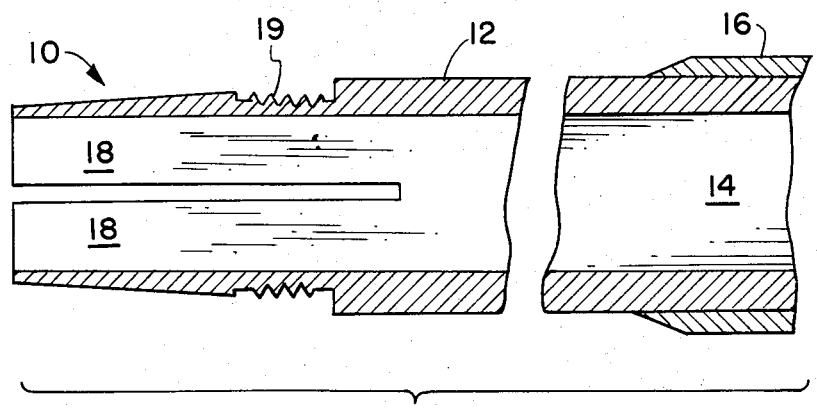
FIG. 1 is a sectional view of a portion of a reusable clamp device according to the present invention and a portion of the elongated insertion/retrieval extension sting therefor.

Referring now more particularly to the drawings, there is shown (FIG. 1) a reusable clamp device generally designated by reference numeral 10. Clamp 10 is machined from stainless steel, tantalum, Inconel (tradename for an alloy consisting essentially of 80% Ni, 14% Cr and 6% Fe) or other equivalent heat resistant materials and is essentially in the form of a sleeve having a first portion 12 thereof being integral with an elongated tube or rod sting 14. Sting 14 is securely attached via sleeve 16 to an automated furnace insertion/retrieval mechanism (not shown).

Figure 2:
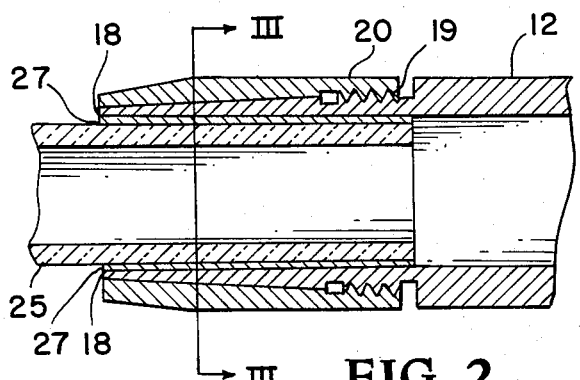
FIG. 2 is a part sectional view of the clamp shown in FIG. 1 in a operative position retaining two objects together.
Figure 3:
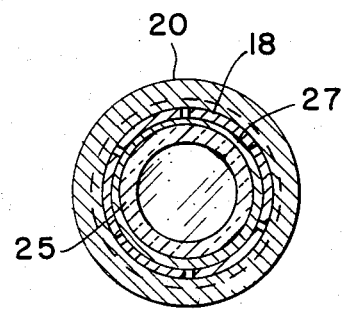
FIG. 3 is a sectional view of the device shown in FIG. 2 and taken along line III—III of FIG. 2.

A plurality of spaced fingers 18 form the other end of clamp 10 and extend from end 12 thereof. Fingers 18 (six shown in the preferred embodiment) are tapered over the length thereof and are disposed in spaced circumferential relationship about the longitudinal axis of clamp 10. A threaded segment 19 (FIGS. 1 and 2) is provided on the exterior surface over a portion of the length of fingers 18. Threaded segment 19 serves to receive lock nut or collar 20 to circumferentially encompass fingers 18. As lock nut 20 is tightened by the threaded connection, the trailing area thereof provides an increasingly inwardly biasing force along the circumference of fingers 18 due to the tapered construction thereof. This squeezing force is transmitted as a uniform grip to the fused quartz ampoule 25 (FIG. 2) disposed within fingers 18. A compressible graphite type foil seal layer 27 having a relatively high radial coefficient of thermal expansion is disposed between the fused quartz and the metal fingers 18 to thereby assure a snug fit for ampoule 25 during the thermal cycling tests. In the preferred embodiment, foil 27 was constructed of multiple layers of graphite foil tape of 0.005 inch thickness. Foil tapes of this type are available, for example, from the Union Carbide Corporation under the tradename Grafoil and are available in the thickness range of 0.005 to 0.020 inch. Any thickness within this range would be suitable for use in practice of the present invention and in the illustrated embodiments Grafoil 0.005 inch thickness was employed in multiple layer. In addition to providing a snug fit for the quartz ampoules over the wide thermal cycling range. The foil layer 27 permits a tight grip to be applied to ampoules 25 without endangering rupture or breakage thereof due to the compressible shock absorbing physical property characteristics of the foil.

Figure 4:
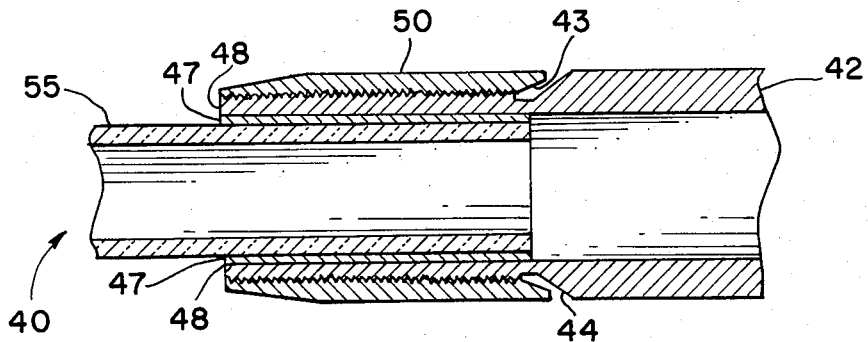
FIG. 4 is a view similar to FIG. 2 showing an alternate embodiment of the present invention.

In FIG. 4 an alternate embodiment of the invention is shown and designated generally by reference numeral 40. As shown therein, the entire length of fingers 48 are provided with fine tapered threads for receiving lock collar nut 50. This tapered threaded arrangement serves to provide adequate squeezing force on fingers 48 to retain the quartz test ampoule 55 therein and without danger of rupturing the ampoule during thermal cycling tests. When desired, threads 48 may be formed on the same radius (or non-tapered) and the cam surface 43 of nut 50 engages cam shoulder 44 to provide adequate squeezing force on fingers 48 to retain ampoule 55 in position. Again, a compressible graphite foil seal 47 is provided between fingers 48 and test ampoule 55 to compensate for the different coefficients of thermal expansion between the quartz and metal clamp structures.

During temperature cycling of the metal clamped quartz ampoules, both the ampoule and lock collar will be expected to increase in diameter as the temperature increases. Since any metal that can be considered useful for practice of the present invention, i.e., those having relatively high coefficients of thermal expansion compared to that of fused quartz, a temperature increase will be detrimental to maintaining a snug fit. The annular lock nut (20 or 50) will expand to a larger internal diameter and even though the clamp fingers (18 and 48) will expand as slabs, the expansion of the fingers will not match the void left by the expanding nut. However, by using the graphite foil tape with a large radial thermal expansion coefficient as intervening layers, employed in the present invention, the greater expansion of the foil will help maintain the snug fit between the fingers and test ampoule at all temperatures in the cycle.

Calculations for the minimum graphite foil thickness required to compensate for the differing coefficients of thermal expansion between the quartz ampoules and the specific clamp embodiments of the present invention have been made and are readily reproducible for specific clamp ampoule dimensions. The coefficients of thermal expansion for the specific examples described herein were:

| | |
|---|---|
| fused quartz ampoules | $= 0.55 \times 10^{-6}/°C.$, |
| tantalum clamps | $= 6.5 \times 10^{-6}/°C.$, |
| graphite foil radial (Grafoil) | $= 27 \times 10^{-6}/°C.$, |
| graphite foil, parallel to quartz | $\begin{cases} = -0.4 \times 10^{-6}/°C. (20° C.-1090° C.) \\ 0.5 \times 10^{-6}/°C. (1090° C.-2200° C.) \text{ and} \end{cases}$ |
| Inconel | $= 14 \times 10^{-6}/°C.$ |

Various changes and modifications in the specific examples are considered within the scope of the invention. For example, sting 14 may be a solid rod or tubular and may be constructed of any material having the thermal resistant properties necessary to be utilized in the temperature range disclosed herein. Also, this temperature range may be expanded as so required for specific tests. Also, clamp 10 may be machined directly from sting element 14 or it may be formed separately and integrally secured to sting 14 in a conventional manner.

It is thus seen that the present invention as described herein is directed to specific embodiments thereof which are given merely to illustrate the invention and are not intended to serve as exhaustive examples thereof. The materials employed in these specific embodiments are also given to comply with the statutory requirements of preferred embodiment description and are not intended to serve as limitations on applicants' broad inventive concept as defined in the appended claims. Also, although the specific clamps described herein show six fingers as the holding mechanism, the increase or decrease of this number is considered within the scope of the invention as claimed. Also, although the graphite foil was used in this embodiment, any anisotropic material with a high radial thermal expansion coefficient is considered within the scope of this invention.

It is therefore to be understood that various modifications and variations of the present invention will be apparent to those skilled in the art without departing from the spirit and scope of the appended claims.

What is claimed as new and desired to be secured by Letters Patent of the United States is:

1. A reusable clamp apparatus for connecting first and second objects comprising:
   means integrally secured to a first object and having a plurality of fingers extending therefrom and adapted to receive a second object,
   means circumferentially engaging said plurality of fingers so as to exert a force thereon to produce a frictional force onto the second object and thermal expansion means disposed along at least a portion of the length of said fingers and between said fingers and said second object to facilitate securing of said second object by said fingers by maintaining frictional force over a wide range of operating temperatures,
   said thermal expansion means comprising a graphite foil having a relatively high radial coefficient of thermal expansion to thereby compensate for any differences in the coefficient of thermal expansion between said first and second objects.

2. A reusable clamp apparatus as in claim 1 wherein said first object is a metal rod and said means integrally secured to said first object includes a sleeve portion, said plurality of fingers being in the form of a tubular extension of said sleeve portion.

3. A reusable clamp apparatus as in claim 2 wherein external threads are provided on said plurality of fingers over at least a portion of the length thereof and said means circumferentially engaging said plurality of fingers being received by said external threads.

4. A reusable clamp apparatus as in claim 2 wherein external threads are provided on said plurality of fingers over the entire length thereof and said means circumferentially engaging said plurality of fingers being a lock nut threadingly received by said external fingers.

5. A reusable clamp apparatus as in claim 1 wherein said first object and said clamp are formed of thermal resistant metal and said second object is a fused quartz ampoule.

6. A reusable clamp as in claim 1 wherein said graphite foil is selected from the thickness range of foils of 0.005 to 0.020 inch thickness and is used in multiple layers.

7. A method of releasably retaining a fused quartz object to a holder while subjecting the fused quartz object to thermal cycling comprising:

providing a sleeve secured to a holder device and having a plurality of spaced extensions leading therefrom;

positioning the fused quartz device within the plurality of spaced extensions;

providing a compressible thermal resistant graphite tape spacer between the fused quartz device and the spaced extension and the graphite tape spacer being selected from a thickness ratio of 0.005 and 0.020 inch thick graphite tapes and having a relatively high radial coefficient of thermal expansion to thereby compensate for any differences in the coefficient of thermal expansion between the holder device and the fused quartz device;

positioning an adjustable retainer around the sleeve extension so as to provide a selective compressive force thereon to force the sleeve extension against the compressible graphite tape spacer, and thereby frictionally retain the fused quartz object in fixed position adjacent to the holder device.

8. The method of claim 7 including integrally machining the sleeve and the plurality of spaced extensions from the end of the holder device so as to provide a decreasing tapered exterior surface leading away from the sleeve toward the end of the extensions.

* * * * *